Patented Oct. 14, 1924.

1,511,561

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARTIFICIAL CRYOLITE.

No Drawing.     Application filed June 8, 1923. Serial No. 644,276.

*To all whom it may concern:*

Be it known that I, HENRY HOWARD, a citizen of the United States, residing at Cleveland, in the county of Cuyahoga and State of Ohio, have invented certain new and useful Improvements in Processes of Making Artificial Cryolite, of which the following is a specification.

This invention relates to certain improvements in the process of making artificial cryolite. In my copending applications, Ser. Nos. 538,646; 572,322; 594,981 and 594,982, filed on Feb. 23, 1922; July 1, 1922; Oct. 16, 1922, and Oct. 16, 1922, respectively, which have matured into Patents 1,475,155; 1,475,156; 1,475,157 and 1,475,158, respectively, dated Nov. 20, 1923, I have described and claimed processes of making artificial cryolite involving in general the interaction of aluminum fluorid and sodium fluorid in the presence of an ammonium compound, and in my copending applications, Ser. Nos. 540,306; 571,295 and 572,035, filed March 1, 1922; June 27, 1922 and June 30, 1922, respectively, the first two of which have matured into Patents 1,464,990 and 1,464,991, respectively, dated Aug. 14, 1923, I have described and claimed processes of making sodium fluorid and the double salt of sodium fluorid and sodium sulfate in which residual solutions containing an ammonium salt and sodium fluorid are treated with aluminum fluorid, whereby artificial cryolite is precipitated and the ammonium salt solution purified.

I have found that in the processes referred to or any other process involving the use of aluminum fluorid and the formation of artificial cryolite in the presence of an ammonium compound certain difficulties are encountered.

Aluminum fluorid exists in two forms or modifications, the one being soluble and the other insoluble in water. Aluminum fluorid when freshly formed, for instance by dissolving aluminum hydroxid [Al(OH)$_3$ or Al$_2$O$_3$.3H$_2$O] in hydrofluoric acid solution, is soluble but it tends to change over to the insoluble modification upon standing. Therefore in the practice of the processes of my said applications some of the insoluble modification of the aluminum fluorid is apt to be and frequently is encountered. I have found that the insoluble modification of the aluminum fluorid can be used successfully in the processes referred to for the formation of artificial cryolite by using instead of a solution of the soluble modification a slurry or suspension of or containing the insoluble modification.

The insoluble aluminum fluorid is considerably less reactive or slower in reacting than the soluble form and the preferred procedure when using the insoluble form in the manufacture of artificial cryolite therefore is to supply the aluminum fluorid to a reaction mixture partly in the soluble form and partly in the insoluble form, the insoluble form being used at the start when there is in the reaction mixture a relatively large excess of the other reagents, and the soluble form being supplied to the reaction mixture to complete the reaction, although it is possible and feasible to supply all of the aluminum fluorid to the reaction mixture in the insoluble form and such practice is contemplated and falls within the scope of the present invention.

I have also found that in the precipitation of artificial cryolite in the presence of an ammonium compound in accordance with the processes of the applications above referred to some ammonium cryolite is formed, that is, the ammonium radical apparently takes the place of sodium in the compound Al$_2$F$_6$.6NaF. This not only introduces an impurity into the artificial cryolite but also results in the loss of ammonia which otherwise would be recovered from the mother liquor after the separation of the artificial cryolite precipitate. This difficulty, that is, the formation of ammonium cryolite or artificial cryolite containing ammonia in what appears to be chemically combined form is overcome in accordance with my invention by replacing the ammonium radical in the cryolite by sodium by digesting the cryolite precipitate in a solution of a sodium compound.

In order that the invention may be clearly understood the following illustrative examples are given:

*Example 1.—Manufacture of artificial cryolite.*

One molecular equivalent of aluminum hydroxid (Al$_2$O$_3$.3H$_2$O) is dissolved in a solution of six molecular equivalents of hydrofluoric acid, giving a solution containing one molecular equivalent of aluminum fluorid ($Al_2F_6$) and a solution of six molecular equivalents of ammonium fluorid is formed by dissolving equal molecular proportions of hydrofluoric acid and ammonia in water. The resulting solutions of aluminum fluorid and ammonium fluorid are then mixed with a solution of six molecular equivalents of a sodium salt of a strong mineral acid such as sodium nitrate. Artificial cryolite is formed in accordance with the reaction equation

The artificial cryolite precipitate is separated from the reaction mixture in any suitable manner, such as by sedimentation, filtration or centrifuging, and is then washed. However, the cryolite product is not absolutely pure but contains a small amount of ammonia which presumably is in chemical combination in the form of $Al_2F_6.6NH_4F$. In order to purify the artificial cryolite product and recover the ammonia content thereof the precipitate is digested in a solution of a sodium salt, for instance sodium nitrate, whereby the ammonium cryolite is converted to the normal or sodium cryolite and ammonium nitrate is formed. The reaction involved is a base exchange or metathesis analogous to that which takes place when the so-called base exchange silicates or zeolites are treated alternately with for instance a solution of a sodium compound and a solution of a calcium compound, the metal in combination in the zeolite being replaced by the metal of the digesting solution.

In the treatment of the impure artificial cryolite precipitate, therefore, it is preferred to digest it in a solution containing an excess of the sodium salt. The digestion may be carried out at atmospheric or elevated temperature and with or without agitation in any suitable manner, the only requisite being that the digesting solution must contain sufficient sodium to bring about the replacement of the ammonium of the cryolite and that the solution and the artificial cryolite be brought into intimate contact and the digestion continued until the replacement is complete or has proceeded to the desired extent.

The artificial cryolite and the digesting solution are then separated, and the artificial cryolite washed and dried. The salt solution which now contains some ammonium nitrate may be treated directly for the recovery thereof, or it may be repeatedly used for the digestion of impure artificial cryolite or it may be used as the solution of sodium salt to which the solution of aluminum fluorid and ammonium fluorid are added at the beginning of the artificial cryolite forming process.

In accordance with the present invention the solution of aluminum fluorid employed in the foregoing example may be substituted wholly or in part by a suspension of an equivalent amount of insoluble aluminum fluorid. The preferred procedure in the use of insoluble aluminum fluorid is to mix the solution of the sodium salt, i. e. sodium nitrate, with the solution of ammonium fluorid and a suspension of the insoluble aluminum fluorid, the latter in quantity insufficient to complete the artificial cryolite forming reaction, say from 10 to 50 per cent of the quantity necessary to complete the reaction, and agitate the mixture until the aluminum fluorid is substantially completely combined and then add sufficient aluminum fluorid in solution to complete the reaction.

*Example 2.—Manufacture of sodium fluorid.*

To a solution of a sodium salt of a strong mineral acid, such as sodium nitrate, is added simultaneously and at rates sufficient to maintain the reaction mixture near to neutrality hydrofluoric acid and ammonia until hydrofluoric acid chemically equivalent to the sodium salt in the solution has been added and the resulting reaction mixture is neutralized with ammonia. The reaction mixture then contains sodium fluorid and ammonium nitrate and is treated by evaporation or cooling or both to crystallize the bulk of the sodium fluorid. Due to the solubility of the sodium fluorid a clean separation thereof from the mother liquor by fractional crystallization is not feasible; the mother liquor ordinarily contains 3% or more of sodium fluorid. To recover this residual sodium fluorid and at the same time purify the ammonium nitrate solution, aluminum fluorid chemically equivalent to the sodium fluorid content of the solution is added whereby artificial cryolite is precipitated. In this process, as in the process described in Example 1, the insoluble aluminum fluorid may be used, preferably however only at the beginning of the reaction when there is a sufficient excess of the sodium fluorid in the reaction mixture to react with the aluminum fluorid without an undesirably prolonged digestion. Also in this process, as in the process of Example 1, the artificial cryolite contains some ammonia which may be removed by digesting the precipitate in a solution of a sodium salt, for instance sodium nitrate.

The foregoing examples illustrate only two of the many possible applications of my invention, the general principles of which are the precipitation of artificial cryolite by the use of aluminum fluorid either formed in or added to the reaction mixture in the presence of an ammonium compound, the use of the insoluble modification of aluminum fluorid for supplying in whole or in part the aluminum fluorid necessary for the reaction, and the purification of the artificial cryolite precipitate by digesting it in a solution of a sodium salt.

As will be apparent my invention provides for the utilization of insoluble aluminum fluorid and thus avoids losses incident to the manufacture of artificial cryolite due to the unavoidable change of the soluble modification to the insoluble modification, and also provides for the purification of artificial cryolite produced from the inexpensive sodium salts of strong mineral acids in the presence of ammonium compounds in the reaction mixture as a result of the use of ammonia or ammonium hydroxid as a neutralizing agent or otherwise.

In place of sodium nitrate any other sodium salt, but preferably an inexpensive sodium salt of a strong mineral acid such as sodium chlorid, sodium sulfate, sodium acid sulfate, sodium bromid, sodium iodid, etc., may be employed.

I claim:

1. In a process in which artificial cryolite is formed by the interaction of aluminum fluorid and sodium fluorid in the presence of an ammonium compound in an aqueous reaction mixture the steps comprising supplying aluminum fluorid to the reaction mixture in insoluble form and digesting the artificial cryolite product in a solution of a sodium salt of a strong acid.

2. In a process in which artificial cryolite is formed by the interaction of aluminum fluorid and sodium fluorid in the presence of an ammonium compound the step comprising digesting the artificial cryolite in a solution of a sodium salt of a strong acid.

3. Process of purifying artificial cryolite containing ammonia which comprises digesting the artificial cryolite in a solution of a sodium salt of a strong acid.

4. Process of making artificial cryolite which comprises treating a solution containing sodium fluorid with a suspension of insoluble aluminum fluorid.

5. Process of making artificial cryolite which comprises adding to a solution containing sodium fluorid a suspension of aluminum fluorid in quantity insufficient to combine with all of the sodium fluorid and thereafter adding a solution of aluminum fluorid to the reaction mixture.

6. Process of making artificial cryolite which comprises treating a solution of ammonium fluorid and a solution of a sodium salt other than the fluorid with a suspension of insoluble aluminum fluorid in quantity less than the chemical equivalent of the sodium salt, thereafter adding to the reaction mixture a solution of aluminum fluorid in quantity sufficient in conjunction with said insoluble aluminum fluorid to react with all of said sodium salt, and digesting the resulting artificial cryolite in a solution of a sodium salt of a strong acid.

7. Process of purifying artificial cryolite as defined in claim 2 in which the sodium salt is sodium nitrate.

8. Process of making artificial cryolite as defined in claim 6 in which the sodium salt other than the fluorid is sodium nitrate and the solution of a sodium salt employed for digesting is a solution of sodium nitrate.

In testimony whereof, I affix my signature.

HENRY HOWARD.